(12) United States Patent
Castro et al.

(10) Patent No.: US 9,229,720 B2
(45) Date of Patent: Jan. 5, 2016

(54) CIRCUIT MARGINALITY VALIDATION TEST FOR AN INTEGRATED CIRCUIT

(75) Inventors: Antonio Castro, Hillsboro, OR (US); Mohammad Al-Aqrabawi, Hillsboro, OR (US); Brad A. Kelly, Hillsboro, OR (US); Rehan Sheikh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1271 days.

(21) Appl. No.: 11/694,755

(22) Filed: Mar. 30, 2007

(65) Prior Publication Data

US 2008/0244235 A1 Oct. 2, 2008

(51) Int. Cl.
| | |
|---|---|
| G06F 15/00 | (2006.01) |
| G06F 7/38 | (2006.01) |
| G06F 9/00 | (2006.01) |
| G06F 9/44 | (2006.01) |
| G06F 9/30 | (2006.01) |
| G06F 9/38 | (2006.01) |
| G06F 11/22 | (2006.01) |

(52) U.S. Cl.
CPC ............ *G06F 9/3017* (2013.01); *G06F 9/3836* (2013.01); *G06F 9/3855* (2013.01); *G06F 11/2236* (2013.01)

(58) Field of Classification Search
CPC ........ G06F 11/27; G06F 11/273; G06F 11/79
USPC ....................................................... 712/244
See application file for complete search history.

(56) References Cited

U.S. PATENT DOCUMENTS

| | | | | |
|---|---|---|---|---|
| 5,142,688 A | * | 8/1992 | Harwood, III | ................. 712/39 |
| 5,729,728 A | * | 3/1998 | Colwell et al. | ................ 712/234 |
| 5,790,822 A | * | 8/1998 | Sheaffer et al. | ............... 712/204 |
| 5,884,071 A | * | 3/1999 | Kosaraju | ....................... 712/245 |
| 6,363,475 B1 | * | 3/2002 | Dowling | ........................ 712/206 |
| 7,111,154 B2 | * | 9/2006 | Rupley et al. | ................. 712/218 |
| 2004/0098570 A1 | * | 5/2004 | Giri | .............................. 712/241 |
| 2006/0015855 A1 | * | 1/2006 | Kumamoto | .................... 717/136 |
| 2007/0192573 A1 | * | 8/2007 | Savransky | .......... G06F 9/30032 |
| | | | | 712/222 |

* cited by examiner

*Primary Examiner* — George Giroux

(74) *Attorney, Agent, or Firm* — Blakely, Sokoloff, Taylor & Zafman LLP

(57) ABSTRACT

A high volume manufacturing (HVM) and circuit marginality validation (CMV) test for an integrated circuit (IC) is disclosed. The IC comprises a port binding and bubble logic in the front end to provide flexibility in binding a port to the uop and to create empty spaces (bubbles) in the uop flow. The out-of-order (OOO) cluster of the IC comprises reservation disable logic to control the flow sequence of the uops and stop schedule logic to temporarily stop dispatching the uops from the OOO cluster to the execution (EXE) cluster. The EXE cluster of the IC comprises signal event uops to generate fault information and fused uJump uops to specify combination of branch prediction, direction, and resolution in any portion of the test. Such features provide a tester the flexibility to perform HVM and CMV testing of the OOO and EXE clusters of the IC.

18 Claims, 2 Drawing Sheets

CIRCUIT MARGINALITY VALIDATION TEST FOR AN INTEGRATED CIRCUIT

BACKGROUND

In an integrated circuit or semiconductor chip manufacturing environments, high volume manufacturing (HVM) tests may refer to testing various portions of the chip in a time effective manner. Circuit marginality validation (CMV) test may refer to one of the tests performed on a chip before concluding that the chip is ready to be shipped. Chip failures may be caused by circuit marginalities. Circuit marginality may encompass failures due to unsafe design approximations, process variations, and failure to account for some electrical and thermal properties of a chip.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a high volume manufacturing (HVM) and circuit marginality validation (CMV) test for an integrated circuit. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
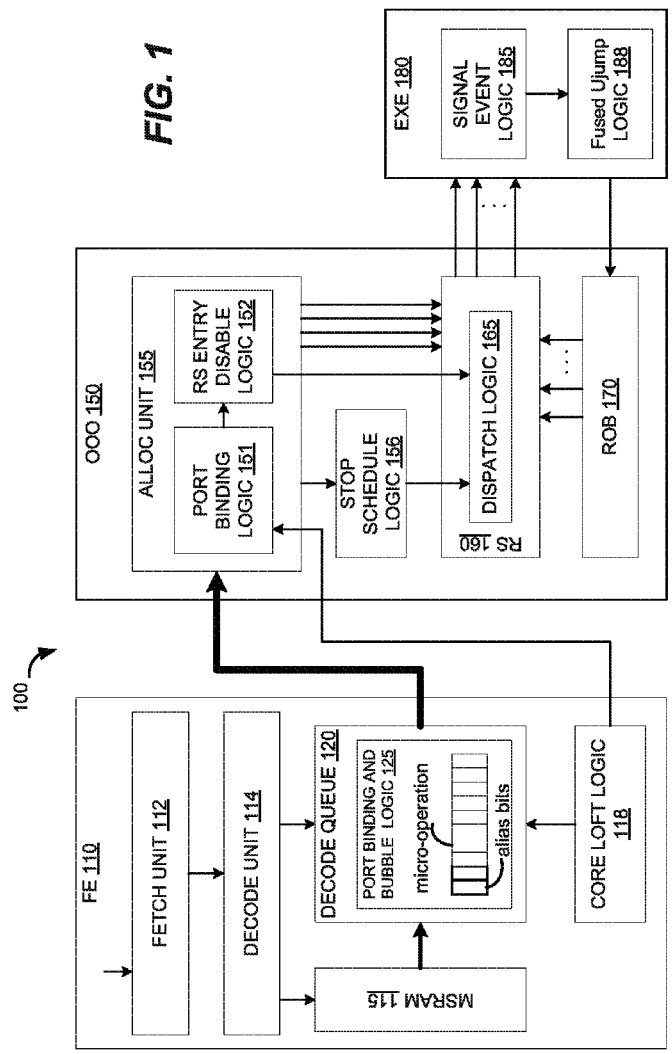
FIG. 1 illustrates an embodiment of an integrated circuit 100.

An embodiment of an integrated circuit 100 is illustrated in FIG. 1. The integrated circuit 100 may comprise a front end (FE) 110, an out-of-order (OOO) cluster 150, and an execution (EXE) cluster 180. In one embodiment, the design for testability (DFT) technique may comprise a micro-code based functional test for testing the OOO cluster 150 and EXE cluster 180.

In one embodiment, the core localized functional test (LOFT) logic 118 may generate LOFT mode signal that enable the integrated circuit 100 to be placed in a LOFT mode. In one embodiment, the LOFT logic 118 may provide the LOFT signal to the port binding and bubble logic 125 and to the port binding logic 151.

The front end 110 may fetch and decode the macro instructions into micro-operations (uops) that the backend of the integrated circuit 100 may interpret and execute. In one embodiment, the front end (FE) 110 may comprise a fetch unit 112, decode unit 114, a micro-sequencer comprising micro-sequence RAM (MSRAM 115), a decode queue 120, and a core LOFT logic 118.

In one embodiment, the fetch unit 112 may fetch the macro instructions from the last level cache (LLC) and send the macro instructions to the decode unit 114. In one embodiment, the decode unit 114 may decode the macro instructions into micro-operations (uops) or may transfer the control to the micro sequencer to read the micro-code (ucode) that realize the behavior of the executed instruction. In one embodiment, the MSRAM 115 may comprise micro-code patches. In one embodiment, the MSRAM 115 may send the uops in a compressed format. For example, a uop in a compressed format may comprise 77 bits and the MSRAM 115 may send compressed uops/cycle having a first width X (=4, for example).

In one embodiment, the decode queue 120 may comprise an aliasing logic, which receives the compressed uops and convert them into aliased uops. In one embodiment, the aliased uops may comprise information such as the actual data sizes, logical sources, and destinations required for execution. In one embodiment, the decode queue 120 may comprise port binding and bubble logic 125. In one embodiment, while operating in core LOFT mode, the port binding and bubble logic 125 may determine the execution port on which a uop may be dispatched. The port binding and bubble logic 125 may also inject bubbles into the uop flow by consuming allocation cycles without dispatching the uop to the EXE 180.

In one embodiment, the port binding and bubble logic 125 may determine the uops that may be dispatched on more than one port and may then determine the port on which the uop may be dispatched. However, some uops that may be dispatched only on specific ports may remain unaffected. In one embodiment, the port binding and bubble logic 125 may use the bits of the uops to encode the port identification of the ports on which the uops may be dispatched. In one embodiment, the port binding and bubble logic 125 may use the address alias and data alias bits of the uops to encode the port identification of the ports on which the uops may be dispatched. In one embodiment, the port binding and bubble logic 125 may overload the two bits of the uops to specify the port binding and such an approach may enable the chip to operate at a maximum uop width specified for the integrated circuit 100. In one embodiment, the maximum uop width specified for the integrated circuit 100 may equal X (=4).

In one embodiment, the port binding and bubble logic 125 may dispatch uop traffic cycles comprising less than the maximum possible number of uops per cycle. For example, the port binding and bubble logic 125 may dispatch less than the maximum uop width specified for the integrated circuit 100 from the front end 110 to the OOO 150. In one embodiment, the port binding and bubble logic 125 may dispatch less than X uops.

In one embodiment, the port binding and bubble logic 125 may place the Bubble uop in any of the uop slots of a line received from the MSRAM 115. In one embodiment, the Bubble uop may comprise a floating point data exchange (FXCH) uop. For example, the uop may comprise four slots (slot-0, slot-1, slot-2, and slot-3) and the port binding and bubble logic 125 may position Bubble uop in any of these 4 slots as compared to positioning the Bubble uop only in slot-3. In one embodiment, the occurrence of the Bubble uop may terminate the line from the MSRAM 115. In one embodiment, flexibility to position the Bubble uop in any slot of the uops may enable a tester to terminate the line from the MSRAM 115 after any slot as compared to terminating the line only after the slot-3.

In one embodiment, a combination of port binding technique to bind a uop to a port and bubble injection technique to insert a bubble uop into any slot of a uop may allow the tester to turn-off individual uops in the flow stream. Turning off individual uops in the flow stream may enable the tester to isolate the problem and associate the problem with a specific uop or uops.

The OOO cluster 150 may manage resources and data dependence required for uops out-of-order execution. In one embodiment, the OOO cluster 150 may comprise an Alloc unit 155, stop schedule logic 156, a reservation station (RS) 160, and a re-order buffer (ROB) 170.

In one embodiment, the Alloc unit 155 may comprise port binding logic 151 and RS entry disable logic 152. In one embodiment, the port binding logic 151 may determine the port on which each uop may be dispatched based on the overloaded bits of the uops received from the port binding and bubble logic 125 of the decode queue 120. Specifying the port binding using the overloaded bits may provide the tester the flexibility to bind the ports to the uops.

The reservation station 160 may comprise two pools, a first pool and a second pool for storing the uops. The reservation station 160 may dispatch uops one form each pool alternatively. The reservation station 160 may employ a ping-pong algorithm to select one uop from each pool. However, while the chip is being tested in core LOFT mode, the scheduling of uops to the EXE 180 may be difficult as the ping-pong algorithm may be taken into consideration while the test patch is written to get the desired traffic. The RS 160 may dispatch the uops to the EXE 180 using the dispatch logic 165.

In one embodiment, the RS entry logic 152 of the OOO cluster 150 may control the sequence of uops to be dispatched. In one embodiment, the RS entry disable logic 152 may disable one of the two pools of the reservation station 160. In one embodiment, the RS disable entry logic 152 may move the uops in the second pool to the first pool of the reservation station 160. Such an approach may disable the ping-pong algorithm thus, effectively scheduling the uops to be dispatched to the EXE 180.

In one embodiment, the stop schedule logic 156 may allow accumulation of uops in the reservation station 160. In one embodiment, the stop schedule logic 156 may temporarily stop the dispatch of the uops from the reservation station 160, which in turn may allow accumulation of uops in the RS 160. The stop schedule logic 156, while operating in active mode, may enable the OOO 150 to dispatch uops/cycle at a second width (=X+Y). In one embodiment, the stop schedule logic 156 may send six (=X+Y) uops per cycle after receiving four (=X) per cycle. Such an approach may allow the RS 160 to fill up. After the RS 160 is filled up, the stop schedule logic 156 may sense the full condition and may allow the RS 160 to dispatch the (X+Y) uops/cycle.

Such an approach may allow the test logic to provide more HVM coverage of the reservation station 160. The RS 160 is a large array and such an approach may allow greater coverage on the entries in the RS 160 and makes it easier to control the bit patterns that are written into the arrays of the reservation station 160.

The re-order buffer 170 may receive the resulting data and flags from the EXE 180 and may store the resulting data until the uops are ready to retire. In one embodiment, the ordered uops stored in the ROB 170 may be used to update the architectural state of the integrated circuit 100.

The EXE 180 may execute the uops and generate the resulting data and fault information before sending the resulting data and the fault information to the ROB 170 of the OOO 150. The EXE 180 may comprise signal event logic 185 and fused Ujump logic 188. In one embodiment, the signal event logic 185 may comprise uops, which may send the fault information and flags to the ROB 170. Such an approach may allow the tester to specify an event or the flag combination without actually having to set up the conditions to cause this flags/fault information. Also, the tester may appropriately position the uop to schedule the time point at which the events occur in relation to occurrence of other events.

In one embodiment, the fused uJump logic 188 may generate uJump uops to specify the combination of branch prediction, direction, and resolution in any part of the test. In one embodiment, the uJump uops may be used to generate desired mis-predicted branches without having to actually set up the real conditions.

Figure 2:
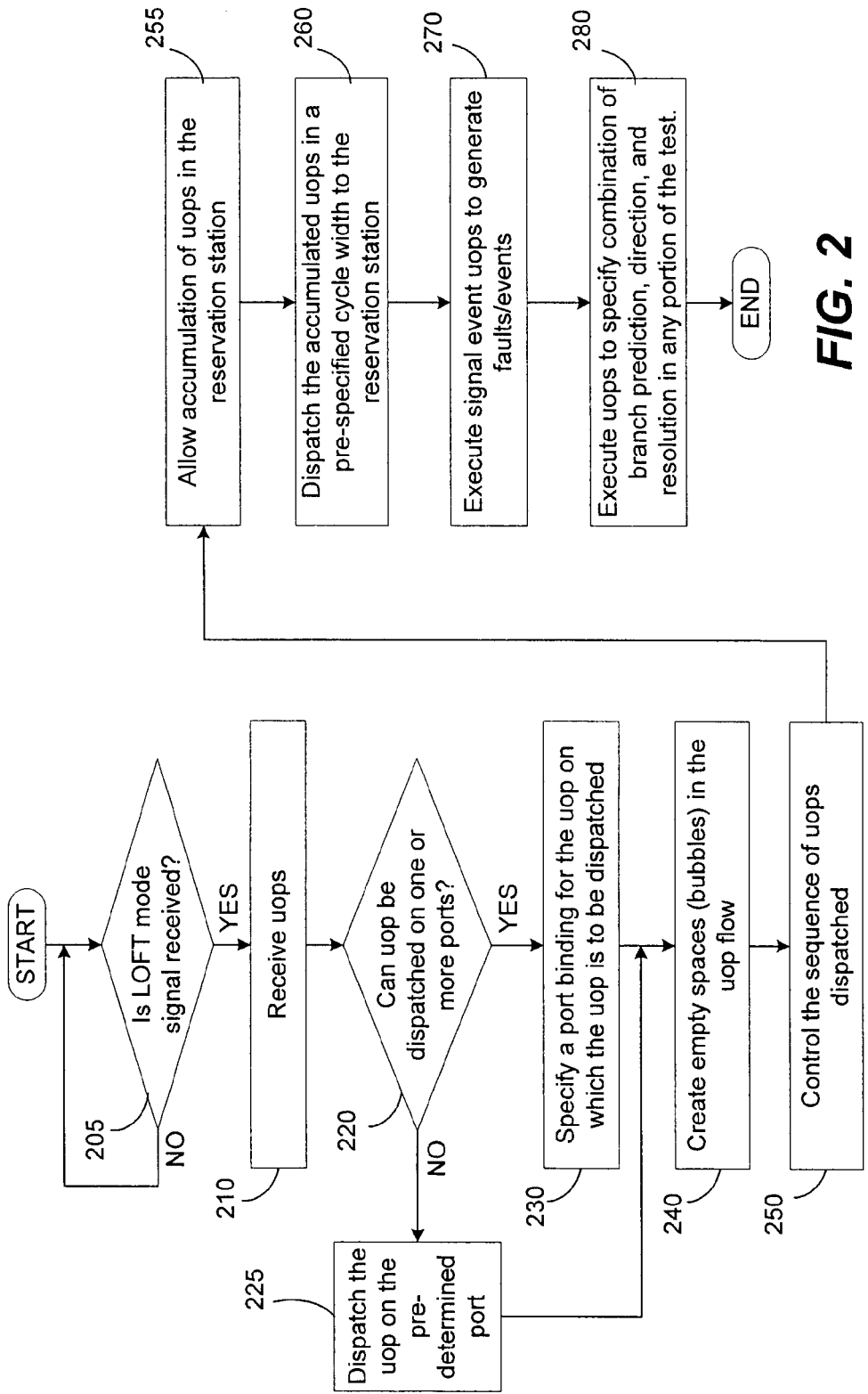
FIG. 2 illustrates an embodiment of micro-code functional test performed on the IC 100 of FIG. 1.

An embodiment of the operation of the integrated circuit 100 in localized functional test (LOFT) mode is illustrated in FIG. 2. In block 205, the port binding and bubble logic 125 and port binding logic 151 may check if the LOFT mode signal is received. In response to receiving the LOFT mode signal, the port binding and bubble logic 125 and port binding logic 151 may operate in the localized functional test (LOFT) mode.

In block 210, the port binding and bubble logic 125 may receive uops from the decode unit 114 or MSRAM 115. In one embodiment, the port binding and bubble logic 125 may receive X uops/cycle.

In block 220, the port binding and bubble logic 125 may check whether the uops can be dispatched on more than one port and control passes to block 230 if the uops can be dispatched on more than one port and control passes to block 225 otherwise.

In block 225, the port binding and bubble logic 125 may dispatch the uops on a pre-specified port and control passes to block 240.

In block 230, the port binding and bubble logic 125 may determine the port binding for the uops and specify the ports on which the uops may be dispatched.

In block 240, the port binding and bubble logic 125 may create empty spaces ('bubbles') in the uop flow. In one embodiment, the port binding and bubble logic 125 may provide the flexibility of positioning of the Bubble uop in any slot, thus creating empty spaces in the uop flow.

In block 250, the RS entry logic 152 of the OOO cluster 150 may control the sequence of uops to be dispatched. In one embodiment, the RS entry logic 152 may disable the ping-pong algorithm to control the sequence of uops being dispatched.

In block 255, the stop schedule logic 156 may allow accumulation of uops in the reservation station 160. In one embodiment, the stop schedule logic 156 may temporarily stop the dispatch of the uops from the reservation station 160, which in turn may allow accumulation of uops in the RS 160.

In block 260, the reservation station 160 may dispatch (X+Y) uops/cycle to the EXE 180. In one embodiment, due the accumulation of the uops, the reservation station 160 may dispatch the (X+Y) uops to use the full width of the uops transfer between the OOO 150 and the EXE 180.

In block 270, the signal event logic 185 of the EXE 180 may receive (X+Y) uops and may execute the uops to generate fault/events. In one embodiment, the signal event logic 185 may execute sig_event uops to generate the resulting data and the fault information and to transfer the resulting data and the fault information to the ROB 170.

In block 280, the fused uJump logic 188 of the EXE 180 may execute uJump uops to specify combination of branch prediction, direction, and resolution in any portion of the test.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A test apparatus to perform circuit marginality validation test in an integrated circuit, comprising:
    a front end unit to bind a micro-operation of a first micro-operation flow generated by a decoder that is dispatchable on more than one of a plurality of ports, to one of the plurality of ports using alias bits of the micro-operation to over-load the micro-operation to specify the one of the plurality of ports and to create a second micro-operation flow from the first micro-operation flow by inserting a floating point data exchange micro-operation in the first micro-operation flow,
    an out-of-order cluster coupled to the front end unit, wherein the out-of-order cluster is to receive the second micro-operation flow and to dispatch the micro-operation of the second micro-operation flow on the one of the plurality of ports specified by the alias bits, and
    an execution cluster coupled to the out-of-order cluster, wherein the execution cluster is to generate fault information of the circuit marginality validation test while the integrated circuit is in a localized functional test mode in response to executing the micro-operation of the second micro-operation flow, wherein the front end unit further comprises a decode queue that includes a first port binding and bubble logic to bind the micro-operation to the one of the plurality of ports based on the alias bits including an address alias bit and a data alias bit of the micro-operation to encode an identifier of the one of the plurality of ports, wherein the front end unit further comprises a localized functional test logic to generate a localized functional test mode signal to enable the integrated circuit to be placed in the localized functional test mode.

2. The test apparatus of claim 1, wherein the first port binding and bubble logic is to insert the floating point data exchange micro-operation into any micro-operation slot of the first micro-operation flow to generate the second micro-operation flow.

3. The test apparatus of claim 1, wherein the out-of-order cluster further comprises a second port binding logic, wherein the second port binding logic is to determine the one of the plurality of ports to dispatch the micro-operation of the second micro-operation flow, wherein the one of the plurality of ports is specified by the two alias bits of the micro-operation.

4. The test apparatus of claim 3, wherein the out-of-order cluster further comprises a reservation station disable logic, wherein the reservation station disable logic is to control a sequence in which the micro-operation of the second micro-operation flow is dispatched.

5. The test apparatus of claim 3, wherein the out-of-order cluster further comprises a stop schedule logic, wherein the stop schedule logic is to generate a third micro-operation flow after receiving the second micro-operation flow, wherein width of the third micro-operation flow is greater than width of the second micro-operation flow.

6. The test apparatus of claim 5, wherein the stop schedule logic is to stop dispatching the micro-operation of the second micro-operation flow during a first duration, wherein the third micro-operation flow includes the micro-operation accumulated during the first duration.

7. The test apparatus of claim 6, wherein the out-of order cluster further comprises a reservation station, wherein the reservation station is to:
    store the micro-operations, which are not dispatched during the first duration, and
    dispatch the micro-operation in the third micro-operation flow on the one of the plurality of ports specified by the alias bits,
    wherein the micro-operation in the third micro-operation flow is dispatched to the execution cluster.

8. The test apparatus of claim 7, wherein the execution cluster further comprises a signal event logic, wherein the signal event logic is to generate fault information in response to receiving the micro-operation.

9. The test apparatus of claim 8, wherein the execution cluster further comprises a fused jump logic, wherein the fused jump logic is to generate jump micro-operations that specify a combination of branch prediction, direction, and resolution of a portion being tested.

10. The test apparatus of claim 2, wherein a combination of the port binding and the floating point data exchange micro-operation turns off individual micro-operations which isolates a problem of the integrated circuit.

11. A method to perform circuit marginality validation test in an integrated circuit, comprising:
    generating a localized functional test mode signal of a localized functional test logic of the integrated circuit to enable the integrated circuit to be placed in a localized functional test mode;
    generating a first micro-operation flow including a micro-operation by decoding macro instruction,
    binding the micro-operation, which is dispatchable on more than one of a plurality of ports, to one of the plurality of ports using alias bits of the micro-operation to over-load the micro-operation to specify the one of the plurality of ports, generating a second micro-operation flow from the first micro-operation flow by inserting a floating point data exchange micro-operation in to the first micro-operation flow, receiving the second micro-operation flow, dispatching the micro-operation of the second micro-operation flow on the one of the plurality of ports specified by the alias bits, and generating fault information of the circuit marginality validation test while the integrated circuit is in a localized functional test mode in response to executing the micro-operation of the second micro-operation flow, wherein binding the micro-operation further comprises over-loading the alias bits including an address alias bit and a data alias bit of the micro-operation of the second micro-operation flow to encode an identifier of the one of the plurality of ports.

12. The method of claim 11, wherein the alias bits include address alias bits and data alias bits of the micro-operation.

13. The method of claim 12 further comprises selecting a sequence in which the micro-operation and other micro-operations of the second micro-operation flow are to be dispatched.

14. The method of claim 12 further comprises generating a third micro-operation flow in a out-of-order block in response to receiving the second micro-operation flow, wherein width of the third micro-operation flow is greater than width of the second micro-operation flow.

15. The method of claim 14, wherein generating the third micro-operation flow comprises, temporarily stopping dispatch of the micro-operations of the second micro-operation flow during a first duration.

16. The method of claim 15, further comprises:

storing the micro-operations, which are not dispatched during the first duration, and dispatching the micro-operation of the third micro-operation flow on the one of the plurality of ports specified by the alias bits.

17. The method of claim 16 further comprises executing signal event micro operations to generate the fault information after receiving the third micro-operation flow.

18. The method of claim 16 further comprises generating jump micro-operations that specify a combination of branch prediction, direction, and resolution of a portion being tested.

* * * * *